United States Patent [19]

Streich

[11] 4,178,967
[45] Dec. 18, 1979

[54] RETRIEVABLE PLUG FOR OFFSHORE PLATFORMS

[75] Inventor: Steven G. Streich, Duncan, Okla.

[73] Assignee: Halliburton Company, Duncan, Okla.

[21] Appl. No.: 942,255

[22] Filed: Sep. 14, 1978

[51] Int. Cl.² .......................................... F16L 55/10
[52] U.S. Cl. ...................................... 138/89; 166/188
[58] Field of Search ................... 138/89, 90; 166/188, 166/332, 333, 334, 192

[56] References Cited

U.S. PATENT DOCUMENTS

| | | | |
|---|---|---|---|
| 2,651,368 | 9/1953 | Baker et al. | 166/188 |
| 2,776,015 | 1/1957 | Bielstein | 166/188 |
| 2,806,539 | 9/1957 | Green et al. | 166/188 |
| 2,854,929 | 10/1958 | McGowen et al. | 166/188 |
| 3,897,824 | 8/1975 | Fisher | 166/188 |
| 4,113,018 | 9/1978 | Barrington et al. | 166/334 |

Primary Examiner—Lenard A. Footland
Attorney, Agent, or Firm—John H. Tregoning; James R. Duzan

[57] ABSTRACT

A reusable plug for sealing the conductor pipe of offshore platforms comprising a cylindrical housing, central body member, pressure equalization means and retractable release means releasably securing the central body member to the cylindrical housing.

18 Claims, 3 Drawing Figures

RETRIEVABLE PLUG FOR OFFSHORE PLATFORMS

This application is related to U.S. patent application Ser. No. 906,900, filed May 18, 1978.

This invention relates to a reusable plug for sealing the interior of hollow cylindrical members, in particular, the conductor pipes of an offshore platform.

Typically, when constructed, an offshore platform has a plurality of conductor pipes running from the top of the platform to the bottom thereof through which the various wells are drilled from the platform. To give added bouyancy during the setting of the platform the interior of each conductor pipe is sealed to prevent the ingress of water. Since the offshore platform can be 1,000 feet tall or more, the conductor pipe plug must be capable of withstanding large hydrostatic fluid pressures thereacross when the offshore platform is installed in position on the floor of the ocean or other body of water.

A typical prior art plug used to seal the interior of a conductor pipe comprises a steel cup retained within a cylindrical housing the same diameter as the conductor pipe and welded thereto. The steel cup is retained within the cylindrical housing by means of a molded elastomeric member which has a portion of the cup retrieving cable spirally wrapped within the elastomeric member. To retrieve the cup from the conductor pipe a force is applied to the free end of the cable at the top of the conductor pipe which, in turn, progressively rips the molded elastomeric member apart thereby freeing the steel cup to move upwardly in the conductor pipe. While such a plug is easy to use, it cannot be reused, it is difficult to control the flow of elastomeric material and the cable retained therein during the manufacturing process and it leaves a residue of elastomeric material in the conductor pipe after being removed therefrom.

In contrast to the prior art the present invention is a reusable plug for conductor pipe comprising a cylindrical housing, a central body member having retractable release means retaining the central body member in the cylindrical housing and, if desired, a pressure equalization means to equalize the fluid pressure acting across the plug before the removal of the plug from the conductor pipe.

The foregoing advantages and the preferred embodiment of the present invention will be better understood from the following specification taken in conjunction with the accompanying drawings wherein.

Figure 1:
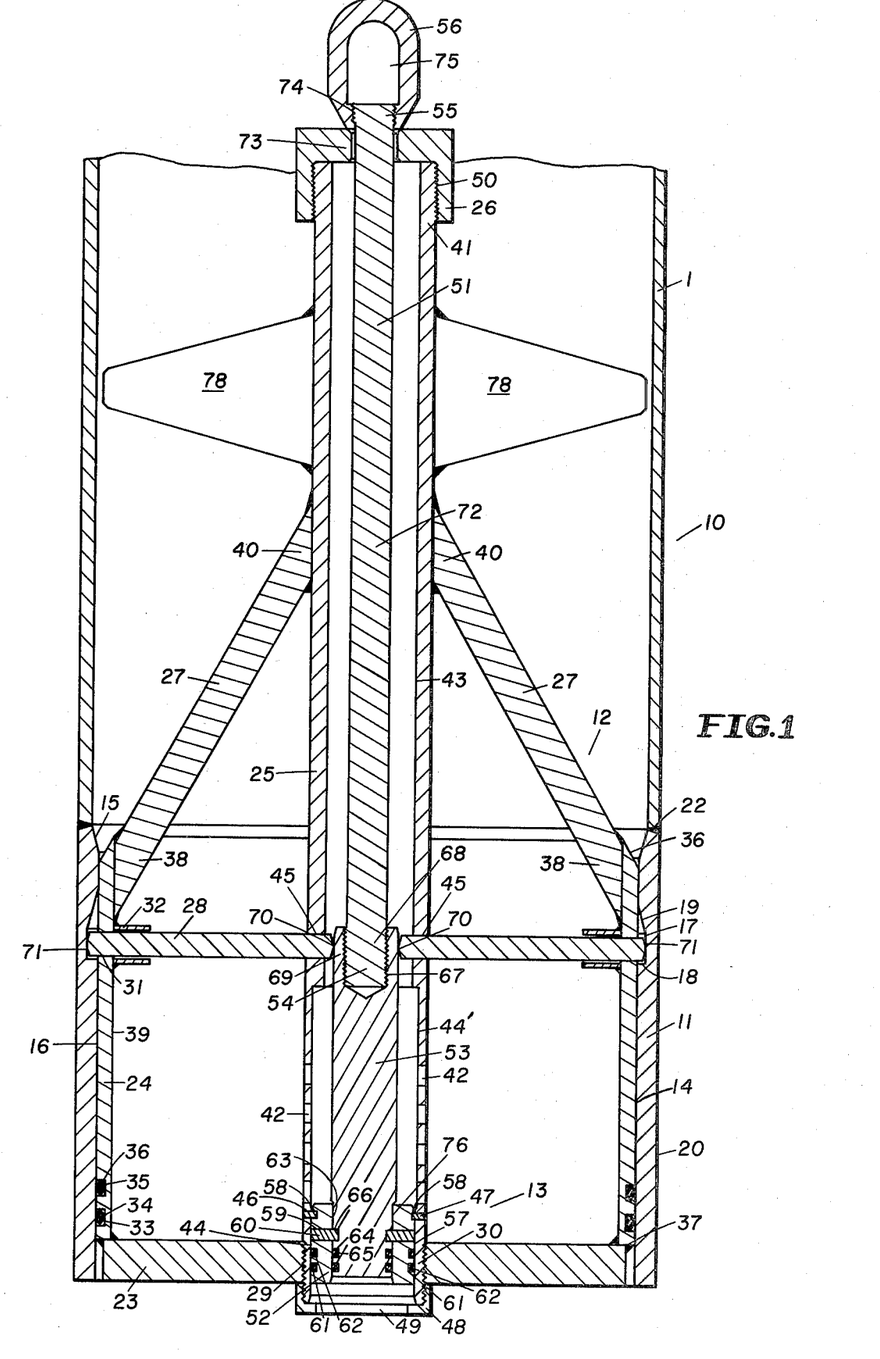
FIG. 1 is a cross-sectional view of the present invention installed in sealing engagement with a portion of conductor pipe.

Referring to FIG. 1, the preferred embodiment of the present invention is shown.

The plug 10 comprises a cylindrical housing 11, central body member 12 and pressure equalization means 13.

The cylindrical housing 11 comprises a cylindrical member 14 having a first annular chamfered surface 15, cylindrical interior surface 16 having therein an annular channel 17 having, in turn, annular shoulder 18 and annular chamfered surface 19, and having an exterior cylindrical surface 20. Rather than having an annular channel 17 formed in the interior surface 16, a plurality of apertures may be formed therein with each aperture having a chamfered surface and shoulder.

The upper chamfered end surface 22 of the cylindrical housing 11 abuts the surface of a portion of conductor pipe 1 which is secured thereto by any suitable means, such as welding.

It should be noted that the interior diameter 16 of the cylindrical housing 11 is slightly smaller than the interior diameter of the conductor pipe 1 thereby allowing the plug 10 to be easily removed through the conductor pipe 1.

The central body member 12 comprises circular plug means 23, annular wall means 24, cylindrical body means 25, cap means 26, reinforcing means 27, and retaining means 28.

The circular plug means 23 comprises a circular plug member of smaller diameter than cylindrical interior surface 16 of the cylindrical housing 11. The circular plug 23 has a central threaded aperture 29 into which is threadedly received the exteriorly threaded end portion 30 of cylindrical body means 25. The cylindrical body means 25 may further be secured to the circular plug means 23 by welding. Secured to the outer periphery of the circular plug means 23 by any suitable means, such as welding, is the annular wall means 24.

The annular wall means 24 comprises a cylindrical member having a plurality of apertures 31 therein and associated guide sleeves 32 receiving retaining means 28 therein, a first annular seal cavity 33 having seal means 34 therein and second annular seal cavity 35 having seal means 36 therein. The upper annular surface 36 of the annular wall means 24 is chamfered to allow the central body member 12 to be withdrawn through the conductor pipe portion 1 while the lower annular surface 37 of the annular wall means 24 abuts circular plug means 23.

The seal means 34 and 36 installed in seal cavities 33 and 35 respectively may be of any suitable cross-sectional configuration and of any suitable elastomeric material, although a seal means having a rectangular cross-sectional configuration is preferred.

To reinforce annular wall means 24 a plurality of reinforcing means 27 are used, each having one end 38 thereof secured about the inner diameter 39 of the cylindrical wall means 24 while the other end 40 thereof is secured to cylindrical body means 25. The reinforcing means 27 are secured to the annular wall means 24 and cylindrical body means 25 by any suitable means, such as welding. The reinforcing means 27 may be of any suitable cross-sectional configuration, such as circular, rectangular, square, etc.

The cylindrical body means 25 comprises a cylindrical member having threaded end portion 30 thereof threadedly engaging threaded aperture 29 of circular plug means 23 while threaded end portion 41 engages cap means 26, and having a plurality of apertures 42 extending through the wall of the cylindrical member to allow communication of the interior of the cylindrical body means 25 with the exterior thereof. The interior of the cylindrical body means 25 is formed having a first cylindrical bore 43, a second cylindrical bore 44, third cylindrical bore 44', a plurality of apertures 45 receiving one end of retaining means 28 therein and a plurality of threaded apertures 46 receiving threaded shear pin means 47 therein. Installed on threaded end 30 of cylindrical body means 25 protruding from circular plug means 23 is a cap means 48 threadedly engaging threaded end 30. The cap means 48 contains opening 49 therein to allow communication from the bottom of circular plug means 23 into the second cylindrical bore 44 of cylindrical body means 25.

Cap means 26 comprises a cap member having a threaded bore 50 which threadedly engages threaded end portion 41 of the cylindrical body means 25 and cylindrical bore 46 through which cylindrical rod means 51 of pressure equalization means 13 extends.

Pressure equalization means 13 comprises sleeve means 52, plug means 53 and cylindrical rod means 51 having one end 54 thereof threadedly engaging plug means 53 while the other end 55 thereof threadedly engages eyelet means 56.

The sleeve means 52 comprises a cylindrical sleeve member having a cylindrical surface 57 which engages second cylindrical bore 44 of cylindrical body means 25. The cylindrical surface 57 of the sleeve means 52 contains a plurality of blind apertures 58, each aperture 58 receiving the end of shear pin means 47 therein to retain the sleeve means 52 in a first position within second cylindrical bore 44 of cylindrical body means 25, contains a plurality of apertures 59, each aperture 59 receiving one end of shear pin means 60 therein, contains annular seal cavities 61, each seal cavity 61 receiving an annuular seal means 62 therein and contains a cylindrical bore 76 therein. The annular seal means 62 may be any suitable elastomeric seal member, such as an elastomeric O-ring member.

Plug means 53 comprises a cylindrical plug member having a first cylindrical surface 63 which contains seal cavities 64 having seal means 65 therein and a plurality of blind apertures 66 which receive a portion of shear pin means 60 therein, having a second cylindrical surface 77 and having a threaded bore 67 therein which threadedly engages threaded end portion 68 of cylindrical rod means 51. The upper end portion 69 of the plug means 53 abuts the end surface 70 of retaining means 28 to hold the retaining means 28 having the other end 71 thereof engaging annular channel 17 of the cylindrical housing 11 thereby retaining the central body member 12 within the cylindrical housing 11. The annular seal means 65 may be any suitable elastomeric seal member, such as an elastomeric O-ring member.

The retaining means 28 comprises a rod member having end surface 70 engaging end portion 69 of plug means 53 while end surface 71 engages annular channel 17 of the cylindrical housing 11. The number of retaining means 28 required to retain the central body member 12 within the cylindrical housing 11 will vary depending upon the loading which the central body member 12 is to be subjected. However, at least two retaining means 28 should be used to retain the central body member 12 within the cylindrical housing 11.

The cylindrical rod means 51 comprises a cylindrical rod member having threaded end portion 68, body portion 72 which extends through bore 73 of cap means 26 and threaded end portion 55 which threadedly engages threaded bore 74 of eyelet means 56.

Eyelet means 56 comprises a cylindrical eyelet member having threaded bore 74 therein and eyelet opening 75 which receives a hoisting means (not shown).

As shown in FIG. 1, the plug 10 is installed in conductor pipe portion 1 by welding the cylindrical housing 11 to the conductor pipe portion 1. If desired, the lower end of cylindrical housing 11 can also have a portion of conductor pipe welded thereto. The central body member 12 is retained within the cylindrical housing 11 by retaining means 28 engaging annular channel 17. Seal means 34 and 36 retained within seal cavities 33 and 35 sealingly engage cylindrical surface 16 of cylindrical housing 11.

Similarly, the pressure equalization means 13 is retained within central body portion 12 having sleeve means 52 being retained in a first position therein by a plurality of shear pin means 47 engaging a plurality of blind apertures 58 in the sleeve means 52. The annular seal means 62 in the annular channels 61 of the sleeve means 52 sealingly engage second cylindrical bore 44 of the cylindrical body means 25. The first cylindrical surface 63 of the plug means 53 engages bore 76 of the sleeve means 52 with annular seal means 65 in sealing engagement with bore 76. The plug means 53 is retained within the sleeve means 52 by shear pin means 60 extending through the apertures 59 in the sleeve means 52 and into blind apertures 66 in the plug means 53. It should be noted that shear pin means 60 are larger in diameter and therefore stronger than shear pin means 47 which retain sleeve means 52 in second cylindrical bore 44 of cylindrical body means 25. The shear pin means 47 and 60 may be formed of any suitable material, such as brass.

The retaining means 28 are cammed into engagement with annular channel 17 of the cylindrical housing 11 by the ends 70 of the retaining means 28 abutting second cylindrical surface 77 of the plug means 53.

When installed in this fashion flow from below plug 10 is blocked from the conductor pipe portion 1 by circular plug means 23, annular seal means 34 and 36 in the cylindrical wall means 24 engaging cylindrical surface 16 of cylindrical housing 11, annular seal means 62 in sleeve means 52 engaging second cylindrical bore 44 of cylindrical body means 25 and annular seal means 65 in plug means 53 engaging bore 76 in sleeve means 52.

If desired, a plurality of centralizer means 78 may be secured to the cylindrical body means 25 by any suitable means, such as welding, to keep the central body member 12 centered in the conductor pipe 1 when it is desired to remove the central body member 12 therefrom. A wellbore centralizer means or any other type centralizer means may be used in place of centralizer means 78. Alternatively, the centralizer means 78 may be deleted from the cylindrical body member 25 if desired.

Figure 2:
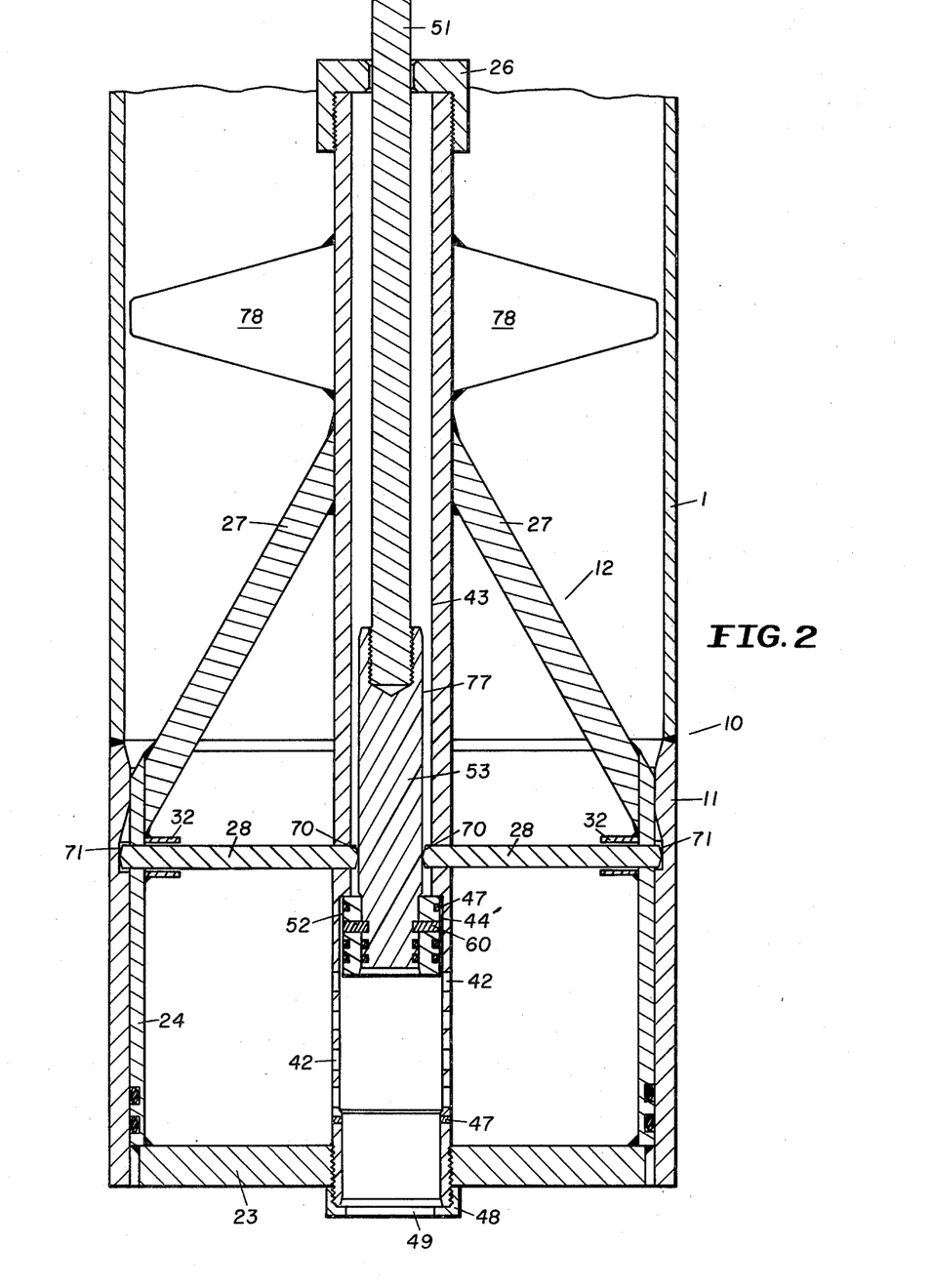
FIG. 2 is a cross-sectional view of the present invention installed in sealing engagement with a portion of conductor pipe with the pressure equalization means actuated.

Referring to FIG. 2, the plug 10 is shown with the sleeve means 52 located in a second position in third cylindrical bore 44' in cylindrical body means 25 to allow any fluid from below the central body member 12 to flow through opening 49 in cap means 48 into the central body member 12, through apertures 42 in central body member 12 and into the conductor pipe portion 1.

To move sleeve means 52 into the second position in the third cylindrical bore 44' in cylindrical body means 25 it is necessary to apply a force to eyelet means 56 which, in turn, is applied through cylindrical rod means 51 and plug means 53 to sleeve means 52 to shear the shear pin means 47 retaining the sleeve means 52 within the cylindrical body means 25. When the shear pin means 47 are sheared, the continued application of force on eyelet means 56 and the fluid pressure acting on the bottom of sleeve means 52 and plug means 53 causes the sleeve means 52 and plug means 53 to move upwardly in cylindrical body means 25 until the sleeve means 53 abuts the shoulder between first cylindrical bore 43 and third cylindrical bore 44' of cylindrical body means 25 thereby allowing any fluid in the interior of the cylindrical body means 25 below the sleeve means 52 and plug means 53 to flow through apertures 42 into conductor pipe portion 1. The plug means 53 is retained within sleeve means 52 by shear pin means 60 after shear pin means 47 have been sheared since shear pin means 60 are larger in diameter, hence stronger than shear pin means 47.

The central plug member 12 is still retained within cylindrical housing 11 when sleeve means 52 is moved into a second position in cylindrical body means 25 since second cylindrical surface 77 of plug means 53 engages end surface 70 of retaining means 28 thereby causing the other end surface 71 of the retaining means 28 to engage annular channel 17 within cylindrical housing 11.

Once the fluid pressure is equalized across the central body member 12, the central body member 12 can be safely removed from the cylindrical housing 11 and conductor pipe portion 1.

Figure 3:
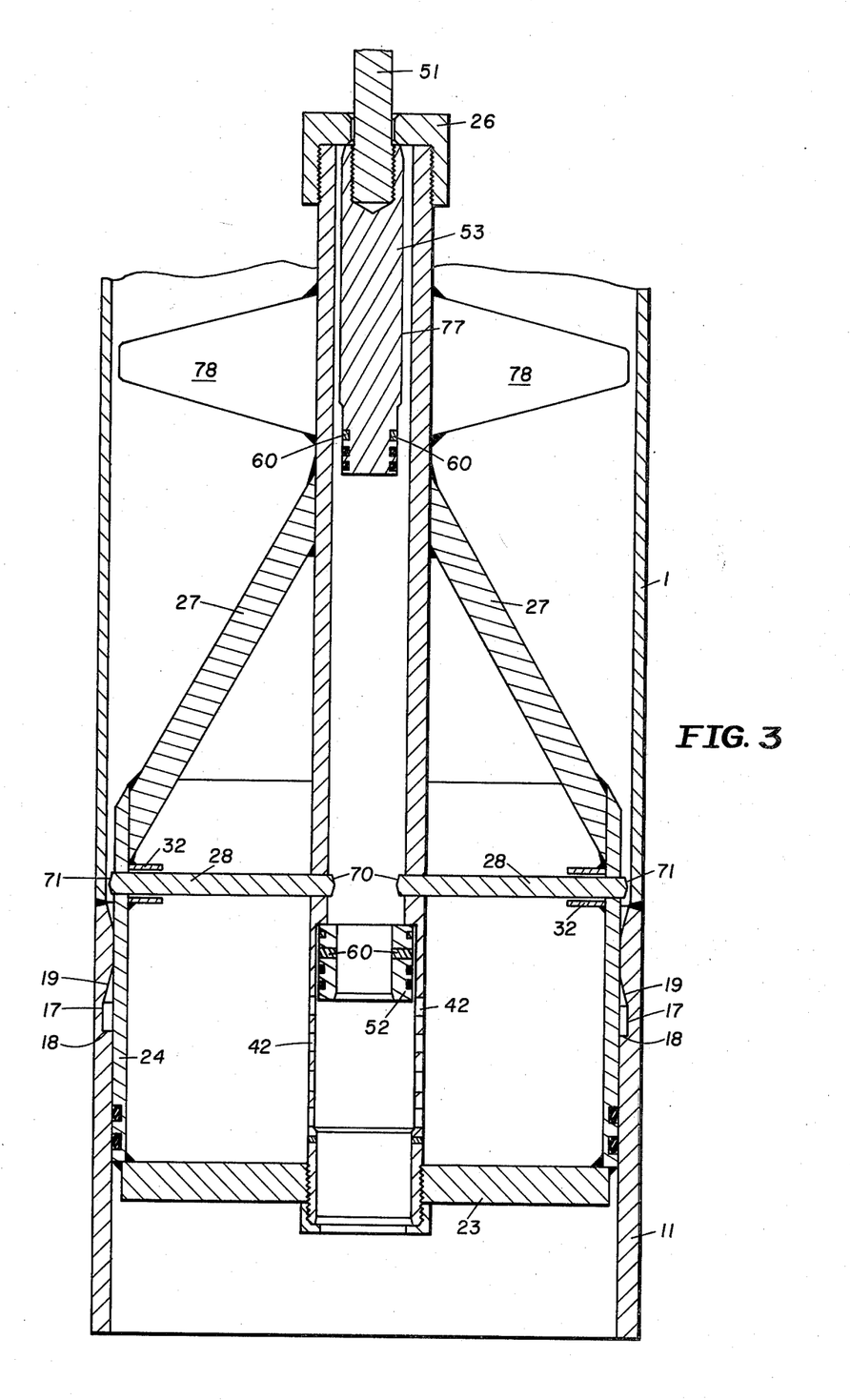
FIG. 3 is a cross-sectional view of the present invention being removed from sealing engagement with a portion of conductor pipe.

Referring to FIG. 3, the central body member 12 is shown being removed from the cylindrical housing 11 and conductor pipe portion 1.

To remove the central body member 12 from the cylindrical housing 11 and conductor pipe portion 1 it is necessary to apply a force to eyelet means 56 (not shown) which, in turn, shears shear pin means 60 thereby releasing plug means 53 from sleeve means 52. When plug means 53 is released from engagement with sleeve means 52, it moves upwardly in cylindrical body means 25 until the top surface of the plug means 53 abuts the bottom surface of cap means 26. When the plug means 53 abuts cap means 26 and central body member 12 is moved upwardly in cylindrical housing 11, the retaining means 28 are free to be cammed inwardly by chamfered annular surface 19 of annular channel 17 in cylindrical housing 11 abutting end surface 71 of the retaining means 28 thereby releasing the central body member 12 from the cylindrical housing 11. After the retaining means 28 are released from engagement with cylindrical housing 11, the continued application of an upward force will cause the central body member 12 to move upwardly disengaging cylindrical housing 11 and upwardly through conductor pipe portion 1. While moving through conductor pipe portion 1, the centralizer means 78, or its equivalent, will help keep the central body member 12 in the center of the conductor pipe portion 1 thereby helping to prevent the central body member from sticking in the conductor pipe portion 1.

It should be noted that, if desired, the pressure equalization means 13 may be deleted from the plug 10. However, if the pressure equalization means 13 is deleted from the plug 10, it will be necessary to fill the conductor pipe portion 1 with fluid before attempting to remove the plug 10 to prevent the large hydrostatic forces which occur across the plug from causing it to be rapidly forced up the conductor pipe portion 1 by the fluid filling that portion of the conductor pipe.

Once the central body member 12 has been removed from the cylindrical housing 11, it can be reused merely by replacing shear pin means 47 and 60, any defective seal means and installing the central body member 12 in another cylindrical housing 11.

It should be readily apparent from the foregoing description that the present invention has the advantages of:

Reusable central body member construction;
Simple construction features;
Pressure equalization means across the plug to prevent filling of the conductor pipe using pumps or other means;
Centralizer means to center the central body member during removal operations;
Positive actuation during pressure equalization and plug release and removal operations;
Only small forces are required to actuate the pressure equalization means and release means to remove the central body member from the conductor pipe; and
No residue or significant obstructions remain in the conductor pipe to restrict the use thereof.

Although this invention has been described in reference to sealing the interior of the conductor pipe of offshore platforms, it is understood that the invention may be used to seal the interior of any cylindrical member.

Having thus described my invention, I claim:
1. A plug for sealing the interior of a hollow cylindrical member to prevent the flow of fluid therethrough, said plug comprising:
 a central body member releasably secured to said hollow cylindrical member in sealing engagement with the interior surface of said hollow cylindrical member, said central body member including:
  circular plug means having a central opening therein;
  annular wall means secured to the outer periphery of said circular plug means having aperture means located therein and having seal means located in the outer surface thereof; and
  cylindrical body means secured about the periphery of the central opening of said circular plug means having first and second aperture means therein, said second aperture means therein allowing the flow of said fluid therethrough;
 retractable retaining means for releasably securing said central body member to said hollow cylindrical member; and
 pressure equalization means for allowing the pressure of said fluid to equalize across said central body member before the removal thereof from said hollow cylindrical member to allow the flow of said fluid through said hollow cylindrical member, said pressure equalization means including:
  sleeve means releasably secured within said cylindrical body means of said central body means in sealing engagement therewith;
  plug means releasably secured to said sleeve means in sealing engagement therewith; and
  rod means secured to said plug means to initially release said sleeve means from said cylindrical body means and subsequently release said plug means from said sleeve means when a force is applied to said rod means
 whereby the sleeve means are released from sealing engagement with said central body means by applying a first force to the rod means therby allowing the flow of said fluid through said hollow cylindrical member and the plug means are released from sealing engagement with the sleeve means by subsequently applying a second force to the rod means, the second force having a magnitude greater than the first force applied to the rod means thereby allowing the removal of said plug from said hollow cylindrical member.

2. The plug of claim 1 wherein the sleeve means of said pressure equalization means includes seal means located in the outer surface thereof in sealing engagement with said cylindrical body means and the plug means of said pressure equalization means includes seal means located in the outer surface thereof in sealing engagement with the sleeve means.

3. A plug for sealing the interior of a hollow cylindrical member to prevent the flow of fluid therethrough, said plug comprising:
a cylindrical housing connected to said hollow cylindrical member, said cylindrical housing comprising:
  a hollow cylindrical member having recessed area means in the wall thereof extending from the interior surface of the hollow cylindrical member through a portion of the thickness of the wall, the recessed area means having chamfered surface means thereon;
a central body member releasably secured to said cylindrical housing in sealing engagement with the interior surface of said cylindrical housing, said central body member comprising:
  circular plug means having a central opening therein;
  annular wall means secured to the outer periphery of said circular plug means having aperture means located therein and having seal means located in the outer surface thereof; and
  cylindrical body means secured about the periphery of the central opening of said circular plug means having first and second aperture means therein, said second aperture means allowing the flow of said fluid therethrough;
retractable retaining means for releasably securing said central body member to said cylindrical housing; and
pressure equalization means for allowing the pressure of said fluid to equalize across said central body member before the removal thereof from said cylindrical housing to allow the flow of said fluid through said hollow cylindrical member, said pressure equalization means comprising:
  sleeve means releasably secured within said cylindrical body means of said central body means in sealing engagement therewith;
  plug means releasably secured to said sleeve means in sealing engagement therewith; and
  rod means secured to said plug means to initially release said sleeve means from said cylindrical body means and subsequently release said plug means from said sleeve means when a force is applied to said rod means
  whereby the sleeve means are released from sealing engagement with said central body means for applying a first force to the rod means thereby allowing the flow of said fluid through said hollow cylindrical member and the plug means are released from sealing engagement with the sleeve means by subsequently applying a second force to the rod means, the second force having a magnitude greater than the first force applied to the rod means thereby allowing the removal of said plug from said hollow cylindrical member.

4. The plug of claim 3 wherein the sleeve means of said pressure equalization means includes seal means located in the outer surface thereof in sealing engagement with said cylindrical body means and the plug means of said pressure equalization means includes seal means located in the outer surface thereof in sealing engagement with the sleeve means.

5. The plug of claim 3 wherein said retractable retaining means comprises:
rod means having a portion thereof extending through the first apertures in said cylindrical body means, having a portion thereof extending through said annular wall means and having a portion thereof engaging the recessed area means of said cylindrical housing.

6. The plug of claim 5 further comprising:
centralizer means attached to the cylindrical body means of said central body member to substantially maintain said central body means centered in said hollow cylindrical member during the removal therefrom.

7. A plug for sealing the interior of a hollow cylindrical member to prevent the flow of fluid therethrough, said plug comprising:
a cylindrical housing connected to said hollow cylindrical member, said cylindrical housing having recessed area means in the wall thereof extending from the interior surface thereof through a portion of the thickness of the wall of said cylindrical housing, the recessed area means having chamfered surface means thereon;
a central body member releasably secured to said cylindrical housing in sealing engagement with the interior surface of said cylindrical housing, said central body member comprising:
circular plug means having a central opening therein;
annular wall means secured to the outer periphery of said circular plug means having aperture means located therein and having seal means located in the outer surface thereof; and
cylindrical body means secured about the periphery of the central opening of said circular plug means having first aperture means and second aperture means therethrough, said second aperture means allowing the flow of fluid through said hollow cylindrical body means;
pressure equalization means for allowing the pressure of said fluid to equalize across said central body means before the removal thereof from said cylindrical housing to allow the flow of fluid through said hollow cylindrical member, said pressure equalization means comprising:
sleeve means releasably secured within said cylindrical body means of said central body member in sealing engagement therewith;
plug means releasably secured to said sleeve means in sealing engagement therewith; and
rod means secured to said plug means to initially release said sleeve means from said cylindrical body member and subsequently release said plug means from said sleeve means when a force is applied to said rod means; and
retractable retaining means for releasably securing said central body member to said cylindrical housing, said retractable retaining means comprising:
rod means having a portion thereof extending through said first aperture means in said cylindrical body means, having a portion thereof extending through said annular wall means, and having a portion thereof engaging the recessed area means of said cylindrical means whereby the sleeve means are released from sealing engagement with said central body means by applying a first force to the rod means thereby allowing the flow of said fluid through said hollow cylindrical member and the plug means are released from sealing engagement with the sleeve means by subsequently applying a second force to the rod means, the second force having a magnitude greater than the first force applied to the rod means thereby allowing the removal of said plug from said hollow cylindrical member.

8. The plug of claim 7 wherein the sleeve means of said pressure equalization means includes seal means located in the outer surface thereof in sealing engagement with said cylindrical body means and the plug means of said pressure equalization means includes seal means located in the outer surface thereof in sealing engagement with the sleeve means.

9. The plug of claim 7 further comprising:
centralizer means attached to the cylindrical body means of said central body member to substantially maintain said central body member centered in said hollow cylindrical member during the removal therefrom.

10. A plug for sealing the interior of a conductor pipe of an offshore platform to prevent the flow of fluid upwardly through said conductor pipe, said plug comprising:
a central body member releasably secured to said conductor pipe in sealing engagement with the interior surface of said conductor pipe, said central body member including:
 circular plug means having a central opening therein;
 annular wall means secured to the outer periphery of said circular plug means having aperture means located therein and having seal means located in the outer surface thereof; and
 cylindrical body means secured about the periphery of the central opening of said circular plug means having first and second aperture means therein, said second aperture means therein allowing the flow of said fluid therethrough;
retractable retaining means for releasably securing said central body member to said conductor pipe; and
pressure equalization means for allowing the pressure of said fluid to equalize across said central body member before the removal thereof from said conductor pipe to allow the flow of said fluid through said conductor pipe, said pressure equalization means including:
 sleeve means releasably secured within said cylindrical body means of said central body means in sealing engagement therewith;
 plug means releasably secured to said sleeve means in sealing engagement therewith; and
 rod means secured to said plug means to initially release said sleeve means from said cylindrical body means and subsequently release said plug means from said sleeve means when a force is applied to said rod means
whereby the sleeve means are released from sealing engagement with said central body means by applying a first force to the rod means thereby allowing the flow of said fluid through said conductor pipe and the plug means are released from sealing engagement with the sleeve means by subsequently applying a second force to the rod means, the second force having a magnitude greater than the first force applied to the rod means thereby allowing the removal of said plug from said conductor pipe.

11. The plug of claim 10 further comprising: centralizer means attached to the cylindrical body means of said central body member to substantially maintain said central body member centered in said conductor pipe during the removal therefrom.

12. The plug of claim 10 wherein the sleeve means of said pressure equalization means includes seal means located in the outer surface thereof in sealing engagement with said cylindrical body means and the plug means of said pressure equalization means includes seal means located in the outer surface thereof in sealing engagement with the sleeve means.

13. A plug for sealing the interior of a conductor pipe of an offshore platform to prevent the flow of fluid upwardly therethrough, said plug comprising:
a cylindrical housing connected to said conductor pipe, said cylindrical housing comprising:
 a hollow cylindrical member having recessed area means in the wall thereof extending from the interior surface of the hollow cylindrical member through a portion of the thickness of the wall, the recessed area means having chamfered surface means thereon;
a central body member releasably secured to said cylindrical housing in sealing engagement jwith the interior surface of said cylindrical housing, said central body member comprising:
 circular plug means having a central opening therein;
 annular wall means secured to the outer periphery of said circular plug means having aperture means located therein and having seal means located in the outer surface thereof; and
 cylindrical body means secured about the periphery of the central opening of said circular plug means having first and second aperture means therein, said second aperture means therein, said second aperture means allowing the flow of said fluid therethrough;
retractable retaining means for releasably securing said central body member to said cylindrical housing; and
pressure equalization means for allowing the pressure of said fluid to equalize across said central body member before the removal thereof from said cylindrical housing to allow the flow of said fluid through said hollow cylindrical member, said pressure equalization means comprising:
 sleeve means releasably secured within said cylindrical body means of said central body means in sealing engagement therewith;
 plug means releasably secured to said sleeve means in sealing engagement therewith; and
 rod means secured to said plug means to initially release said sleeve means from said cylindrical body means and subsequently release said plug means from said sleeve means when a force is applied to said rod means
whereby the sleeve means are released from sealing engagement with said central body means applying a first force to the rod means thereby allowing the flow of said fluid through said conductor pipe and the plug means are released from sealing engagement with the sleeve means by subsequently applying a second force to the rod means, the second force having a magnitude greater than the first force applied to the rod means thereby allowing the removal of said plug from said hollow cylindrical member.

14. The plug of claim 13 wherein said retractable retaining means comprises:
rod means having a portion thereof extending through the first apertures in said cylindrical body means, having a portion thereof extending through said annular wall means and having a portion thereof engaging the recessed area means of said cylindrical housing.

15. The plug of claim 13 wherein the sleeve means of said pressure equalization means includes seal means located in the outer surface thereof in sealing engagement with said cylindrical body means and the plug means of said pressure equalization means includes seal means located in the outer surface thereof in sealing engagement with the sleeve means.

16. A plug for sealing the interior of a conductor pipe on an offshore platform to prevent the flow of fluid therethrough, said plug comprising:
a cylindrical housing connected to said conductor pipe and having recessed area means in the wall thereof extending from the interior surface thereof through a portion of the thickness of the wall of said cylindrical housing, the recessed area means having chamfered surface means thereon;
a central body member releasably secured to said cylindrical housing in sealing engagement with the exterior surface thereof, said central body member comprising:
circular plug means having a central opening therein;
annular wall means secured to the outer periphery of said circular plug means having aperture means located therein and having seal means located in the outer surface thereof; and
cylindrical body means secured about the periphery of the central opening of said circular plug means having first aperture means and second aperture means therethrough, said second aperture means allowing the flow of fluid through said cylindrical body means;
pressure equalization means for allowing the pressure of said fluid to equalize across said central body member before the removal thereof from said conductor pipe to allow the flow of fluid through said cylindrical housing, said pressure equalization means comprising:
sleeve means releasably secured within said cylindrical body means of said central body member in sealing engagement therewith;
plug means releasably secured to said sleeve means in sealing engagement therewith; and
rod means secured to said plug means to initially release said sleeve means from said cylindrical body member and subsequently release said plug means from said sleeve means when a force is applied to said rod means; and
retractable retaining means for releasably securing said central body member to said cylindrical housing, said retractable retaining means comprising:
rod means having a portion thereof extending through said first aperture means in said cylindrical body member, having a portion thereof extending through said annular wall means, and having a portion thereof engaging the recessed area means of said cylindrical housing;
whereby the sleeve means are released from sealing engagement with said central body means by applying a first force to the rod means thereby allowing the flow of said fluid through said conductor pipe and the plug means are released from sealing engagement with the sleeve means by subsequently applying a second force to the rod means, the second force having a magnitude greater than the first force applied to the rod means thereby allowing the removal of said plug from said conductor pipe.

17. The plug of claim 16 further comprising:
centralizer means attached to the cylindrical body means of said central body member to substantially maintain said central body member centered in said conductor pipe during the removal therefrom.

18. The plug of claim 16 wherein the sleeve means of said pressure equalization means includes seal means located in the outer surface thereof in sealing engagement with said cylindrical body means and the plug means of said pressure equalization means includes seal means located in the outer surface thereof in sealing engagement with the sleeve means.

* * * * *

UNITED STATES PATENT AND TRADEMARK OFFICE
CERTIFICATE OF CORRECTION

PATENT NO. : 4,178,967

DATED : December 18, 1979

INVENTOR(S) : Steven G. Streich

It is certified that error appears in the above-identified patent and that said Letters Patent are hereby corrected as shown below:

Column 10, line 45, delete the phrase "said second aperture means therein."
"    " line 68, after the word "means" insert the word --by--.

Signed and Sealed this

Eighteenth Day of March 1980

[SEAL]

Attest:

SIDNEY A. DIAMOND

Attesting Officer      Commissioner of Patents and Trademarks